United States Patent [19]

Faulkner et al.

[11] Patent Number: 4,752,541

[45] Date of Patent: Jun. 21, 1988

[54] ELECTROLYTE FOR LITHIUM-SULFUR DIOXIDE ELECTROCHEMICAL CELL

[75] Inventors: Larry R. Faulkner, Urbana, Ill.; Isobel J. Davidson, Vancouver, Canada

[73] Assignee: Amoco Corporation, Chicago, Ill.

[21] Appl. No.: 23,777

[22] Filed: Mar. 9, 1987

[51] Int. Cl.$^4$ ...................... H01M 4/36; H01M 6/14
[52] U.S. Cl. ................................ 429/101; 429/105; 429/196; 429/197; 429/50; 252/62.2; 204/2.1; 204/68
[58] Field of Search ............... 429/196, 197, 101, 105, 429/194, 50; 252/62.2; 204/2.1, 68

[56] References Cited

U.S. PATENT DOCUMENTS

| | | | |
|---|---|---|---|
| 3,493,433 | 2/1970 | Hoffman | 429/196 |
| 3,578,500 | 5/1971 | Maricle et al. | 429/196 X |
| 4,397,921 | 8/1983 | Xenzhek et al. | 429/197 X |
| 4,508,800 | 4/1985 | Gupikanth | 429/196 |
| 4,643,958 | 2/1987 | Thrash | 429/196 X |

FOREIGN PATENT DOCUMENTS 2140146  7/1971  Fed. Rep. of Germany ...... 429/196

*Primary Examiner*—Brian E. Hearn
*Assistant Examiner*—Stephen J. Kalafut
*Attorney, Agent, or Firm*—Richard A. Kretchmer; William H. Magidson; Ralph C. Medhurst

[57] ABSTRACT

Aluminum chloride can be used as an electrolyte component in a lithium-sulfur dioxide electrochemical cell to improve the cell's discharge capacity and also its electrochemical reversibility.

16 Claims, No Drawings

ELECTROLYTE FOR LITHIUM-SULFUR DIOXIDE ELECTROCHEMICAL CELL

FIELD OF THE INVENTION

This invention relates to an improved lithium-sulfur dioxide electrochemical cell. More particularly, it relates to the use of aluminum chloride as an electrolyte component.

BACKGROUND OF THE INVENTION

A substantial amount of interest has recently been centered on the development of ambient temperature, high energy density, electrochemical cells which are light in weight and capable of providing a higher voltage than conventional cells such as nickel-cadmium and lead-acid systems or alkaline cells having zinc anodes. The high energy density cell systems which are currently of interest typically involve the use of active metals (metals with reduction potentials which are more negative than that of hydrogen in the electromotive series of elements in an aqueous environment) as anodes in combination with nonaqueous electrolytes. As used herein, "nonaqueous" is intended to mean substantially free of water. Lithium has been of particular interest as an active metal for such high energy density cells since it is the most active of the metals in the electromotive series and has the ability in an electrochemical cell to provide the highest performance in watt-hours per kilogram of all known active metals.

In conventional electrochemical cells, cathode depolarizers are used in a form which will permit an external electrical circuit, such as a set of wires connecting the electrodes of a cell, while also effecting a physical separation of the cathode depolarizer from the anode. In such cells, the cathode depolarizer is generally an insoluble, finely divided solid which is either admixed with or used as a coating over an inert conducting material, such as a nickel or carbon rod, which serves as a current collector or cathode. The physical separation of the cathode depolarizer from the anode is necessary to prevent a direct chemical reaction between the anode material and the cathode depolarizer which would result in self-discharge of the cell.

Until recently, it was generally believed that a direct physical contact between the cathode depolarizer and the anode could not be permitted within an electrochemical cell. It has been discovered, however, that certain cathode depolarizers do not react chemically to any appreciable extent with active metal anodes at the interface between the anode and the cathode depolarizer. Accordingly, with materials of this type, it is possible to construct an electrochemical cell wherein an active metal anode is in direct contact with the cathode depolarizer. For example, U.S. Pat. No. 567,515 issued to Maricle et al. on Mar. 2, 1971, discloses the use of sulfur dioxide as a cathode depolarizer in such a cell.

British patent specification No. 2,124,821 is directed to an electrochemical cell which contains an active metal anode, a solid active cathode, and an electrolyte which is comprised of a liquid solvate-complex of sulfur dioxide and an alkali or alkaline earth metal salt. It is disclosed that lithium tetrachloroaluminate (LiAlCl$_4$) is a suitable salt and that the solvate can be prepared by reaction of sulfur dioxide with a stoichiometric mixture of the Lewis acid and base components of the salt, AlCl$_3$ and LiCl. It is further disclosed that an organic cosolvent, such as acetonitrile, dimethoxyethane and propylene carbonate, can be used as an electrolyte component in combination with electrolyte salts that are not normally soluble in sulfur dioxide alone. However, there is no suggestion of the use of aluminum chloride as an electrolyte component.

U.S. Pat. No. 3,493,433, issued to Hoffmann on Feb. 3, 1970, discloses a nonaqueous electrochemical cell which contains a lithium anode and a solution of lithium tetrachloroaluminate (LiAlCl$_4$) in liquid sulfur dioxide as an electrolyte. In addition, the plating of lithium is described from a solution which is composed of propylene carbonate which is saturated with both LiAlCl$_4$ and sulfur dioxide. Similarly, U.S. Pat. No. 3,953,234, issued to Hoffmann on Apr. 27, 1976, discloses an electrochemical cell which contains a lithium anode and an electrolyte which is composed of an electrolyte salt dissolved in a mixture of sulfur dioxide and at least one organic cosolvent having no acidic hydrogen atoms and containing an element having at least one unshared electron pair. However, neither of these two references contains any suggestion of the use of aluminum chloride as an electrolyte component.

U.S. Pat. No. 4,375,502, issued to Gabano on Mar. 1, 1983, is directed to a lithium-thionyl chloride electrochemical cell wherein the electrolyte is composed of a solution in thionyl chloride of at least one salt selected from the group consisting of lithium tetrachloroaluminate and lithium hexachloroantimonate and a complex selected from the group consisting of AlCl$_3$.SO$_2$ and SbCl$_5$.SO$_2$. It is also disclosed that a second solvent, such as phosphoryl chloride or sulfuryl chloride, can be added to the thionyl chloride. However, it is further disclosed that the electrolyte does not include an excess of sulfur dioxide over that required for complex formation with aluminum chloride or antimony pentachloride.

U.S. Pat. No. 3,508,966, issued to Elsenberg on Apr. 28, 1970, discloses a nonaqueous electrolyte for use in a nonaqueous electrochemical cell wherein the anode is selected from the group consisting of lithium, sodium, calcium and magnesium and the active cathode material is a halide of a metal selected from the group consisting of copper, silver, iron, nickel and cobalt. The electrolyte is a solution which is composed of: (a) an organic solvent, such as propylene carbonate, (b) a Lewis acid, such as aluminum chloride, in combination with at least an equimolar amount of a coordinating compound, such as lithium chloride, which will react with the Lewis acid to yield a complex, and (c) a saturator salt which is a metal halide salt having a cation of the element used as the anode metal and the same anion as that of the active cathode material. This reference contains no suggestion of the use of sulfur dioxide as an electrolyte component and fails to suggest the use of unreacted aluminum chloride as an electrolyte component.

German Offenlegungsschrift No. DE 3431134 Al, dated Mar. 6, 1986, discloses a primary electrochemical cell which contains a lithium electrode, an organic polymer which is electrochemically oxidizable and/or reduceable as the active material of a second electrode, and an electrolyte which is composed of a solution of MHal in sulfur dioxide where M can be Al, Fe or Ti and Hal can be Br or Cl. However, this Offenlegungsschrift contains no suggestion that a solution of aluminum chloride in sulfur dioxide could be used as an electrolyte in an electrochemical cell wherein sulfur dioxide is electrochemically reduced. Further, this reference contains no suggestion of the use of a polar organic compound as an electrolyte component.

Rechargeable lithium-sulfur dioxide electrochemical cells which employ conventional electrolytes are typically characterized by a low discharge capacity and also by poor cycling behavior with reversibility problems occurring at both anode and cathode. As a result of these limitations, the utility of such cells has been severely limited.

SUMMARY OF THE INVENTION

The present invention is directed to the discovery that aluminum chloride can be used as an electrolyte component for lithium-sulfur dioxide electrochemical cells to improve discharge capacity and cycling characteristics.

One embodiment of the invention is a nonaqueous conductive liquid which comprises a solution of aluminum chloride and at least one lithium salt in a mixture of liquid sulfur dioxide with at least one polar organic compound.

Another embodiment of the invention is an electrochemical cell wherein sulfur dioxide is electrochemically reduced upon discharge which comprises in combination: (a) an anode which is comprised of lithium, (b) a cathode, and (c) a nonaqueous conductive liquid electrolyte which comprises a solution of aluminum chloride and at least one lithium salt in liquid sulfur dioxide.

A further embodiment of the invention is a process for electrodepositing lithium comprising electrolyzing a nonaqueous solution which comprises aluminum chloride and at least one lithium salt dissolved in liquid sulfur dioxide, wherein the mole ratio of sulfur dioxide to aluminum chloride in said solution is at least about 1.05.

An object of the invention is to provide an improved lithium-sulfur dioxide electrochemical cell.

Another object of the invention is to provide an improved electrolyte for use in lithium-sulfur dioxide electrochemical cells.

Another object of the invention is to provide a rechargeable lithium-sulfur dioxide electrochemical cell which has an improved discharge capacity.

A further object of the invention is to provide a rechargeable lithium-sulfur dioxide electrochemical cell with improved cycling properties at both anode and cathode.

DETAILED DESCRIPTION OF THE INVENTION

We have found that the presence of chemically uncombined aluminum chloride in the electrolyte of a lithium-sulfur dioxide electrochemical cell serves to improve the discharge capacity of the cell. In addition, the aluminum chloride also serves to improve the cycling characteristics of rechargeable lithium-sulfur dioxide electrochemical cells.

The aluminum chloride of this invention can, of course, be solvated by the electrolyte solvent or solvents. However, it is otherwise chemically uncombined and refers to that aluminum chloride which is in excess of any that may react chemically with any other materials that are used in preparation of the electrolyte or are introduced into the electrolyte. For example, lithium chloride (LiCl) reacts with aluminum chloride ($AlCl_3$) to yield lithium tetrachloroaluminate ($LiAlCl_4$), a lithium salt. With reference to an electrolyte prepared by dissolving lithium chloride and aluminum chloride in a suitable solvent system, the aluminum chloride of this invention refers to that material which is in excess of the amount consumed by chemical reaction with the lithium chloride.

In addition to aluminum chloride, the electrolyte used in the practice of this invention additionally comprises at least one lithium salt. This salt serves to improve the conductivity of the electrolyte. In addition, a high lithium cation ($Li^+$) concentration in the electrolyte is highly desirable since this is believed to promote the formation of a pasivating film of lithium dithionite on the lithium anode. Further, this lithium salt serves as a source of lithium for electrodeposition.

Suitable lithium salts for use in the practice of this invention include all lithium salts which are soluble in the electrolyte system. For example, the electrolyte of this invention can be prepared by combining a lithium salt such as lithium chloride, lithium dithionite or lithium trifluoromethanesulfonate with aluminum chloride in a suitable solvent system. However, some lithium salts, like lithium chloride, can undergo chemical reaction with a portion of the aluminum chloride to yield one or more new lithium salts in solution. Accordingly, the lithium salt required for the practice of this invention can be any ionic material which is comprised of lithium cations.

The aluminum chloride content of the electrolyte can range from about 0.01 molar up to the amount required for saturation of the electrolyte. Preferably, however, the amount of aluminum chloride is in the range from about 0.1 molar up to the amount required for saturation of the electrolyte, and more preferably in the range from about 0.1 to about 6 molar. The ratio of moles of aluminum chloride to equivalents of lithium cation ($Li^+$) in the electrolyte is desirably in the range from about 0.001 to about 100, preferably from about 0.01 to about 50, and more preferably from about 0.1 to about 30.

The electrolyte for use in the electrochemical cell of this invention comprises sulfur dioxide which is electrochemically reduced during discharge of the electrochemical cell. This sulfur dioxide also functions as a solvent for the aluminum chloride and lithium salt which are required in the practice of this invention. In the absence of any surface contamination on the lithium anode which can initiate self-discharge, the cathode depolarizer is stable when in contact with this electrode. Although the reasons for this are not well understood, it is believed that the anode is passivated by the formation of a thin film of lithium dithionite ($Li_2S_2O_4$) which then prevents further sulfur dioxide molecules from reaching the lithium anode surface and thereby prevents self-discharge. Nevertheless, this thin film permits electrochemical oxidation and reduction to take place at the lithium anode during operation of the cell by passage of lithium cations through the film.

As stated above, the sulfur dioxide component of the electrolyte of this invention functions as a solvent for the other electrolyte components. Accordingly, the mole ratio of sulfur dioxide to aluminum chloride is at least about 1.05, preferably from about 1.5 to about 200, and more preferably from about 2.0 to about 175.

If desired, the electrolyte for use in the electrochemical cell of this invention can additionally comprise one or more dissolved electrolyte salts other than the required aluminum chloride and lithium salt. Such additional lithium-free electrolyte salts are ordinarily selected and utilized in amounts which are effective to provide an improved conductivity for efficient operation of the electrochemical cell. Suitable additional electrolyte salts include, but are not limited to, salts containing metal cation complexes, quaternary ammonium salts, phosphonium salts, pyridinium salts and arsonium salts.

In addition to sulfur dioxide, aluminum chloride, and at least one lithium salt, the electrolyte for use in the electrochemical cell of this invention can additionally comprise one or more polar organic compounds which are substantially inert to the other electrolyte components and to lithium metal. Such organic compounds lack acidic hydrogen atoms and contain one or more atoms having at least one unshared pair of electrons. For the purposes hereof, "acidic hydrogen atoms" are those hydrogen atoms which are capable of being readily abstracted by lithium metal. However, strongly basic organic compounds such as amines are not generally desirable.

The use of a polar organic compound as an additional electrolyte component represents a highly preferred embodiment of the invention since the presence of this organic material typically results in a further improvement in the discharge capacity of the cell. Although the reason for this effect by the polar organic compound is unknown, it is believed that the effect may be related to an enhancement of aluminum chloride ionization in the electrolyte by the organic compound.

Suitable polar organic compounds are typically liquids but can also be solids which are soluble in sulfur dioxide, such as ethylene carbonate (mp 40° C.) and sulfolane (mp 27° C.). These organic compounds contain at least one element which is selected from Groups 3a, 4a, 5a and 6a of the Periodic Table (*Handbook of Chemistry and Physics*, 57th ed., 1976–77, p. B-4). Preferred elements from this group include, for example, boron, silicon, nitrogen, phosphorus, oxygen and sulfur as well as combinations of these elements.

Suitable polar organic compounds for use in the practice of this invention include, but are not limited to, trialkyl borates, boronic acid esters, borinic acid esters, tetraalkyl silicates, alkylalkyoxyl silanes, nitroalkanes, alkyl nitriles, dialkyl amides, lactams, tetraalkyl ureas, acetals, ketals, monocarboxylic acid esters, orthoesters, lactones, dialkyl carbonates, alkylene carbonates, orthocarbonates, monoethers, polyethers, monocarboxylic acid anhydrides, dialkyl sulfates, dialkyl sulfites, alkylene sulfites and sulfones. Specific examples include triethyl borate, diethyl methylboronate, methyl diethylborinate, tetramethyl silicate, trimethoxymethylsilane, nitroethane, acetonitrile, dimethylformamide, 1-methyl-2-pyrrolidinone, tetramethyl urea, 1,1-diethoxyethane, 2,2-dimethyoxypropane, 1,3-dioxolane, ethyl acetate, trimethyl orthoformate, γ-butyrolactone, dimethyl carbonate, ethylene carbonate, propylene carbonate, tetramethyl orthocarbonate, diethyl ether, tetrahydrofuran, 1,2-dimethoxyethane, acetic anhydride, dimethyl sulfate, dimethyl sulfite, ethylene sulfite and sulfolane (tetramethylene sulfone).

Preferred polar organic compounds for use in the practice of this invention include alkyl nitriles, dialkyl amides, lactams, monocarboxylic acid esters, ortho esters, lactones, dialkyl carbonates, alkylene carbonates, orthocarbonates, monoethers and polyethers. Highly preferred polar organic compounds have a Donor Number in the range from about 10 to about 25, where Donor Number is defined as the molar enthalpy for the reaction of a given polar organic compound with $SbCl_5$ as a reference electron acceptor in a 0.001 molar solution in 1,2-dichloroethane (for a discussion of Donor Number and a tabulation of Donor Numbers for various solvents, see *Lithium Batteries*, Jean-Paul Gabano, Ed., Academic Press, 1983, pp 17 and 18). Specific polar organic compounds which have been found to be highly satisfactory for use in the practice of this invention include propylene carbonate, ethylene carbonate, 1,2-dimethoxyethane, 1,3-dioxolane, acetonitrile and γ-butyrolactone.

When a polar organic compound is used as an electrolyte component in the practice of this invention, the electrolyte desirably comprises a mixture of sulfur dioxide and at least one polar organic compound, wherein the amount of sulfur dioxide is in the range from about 20 to about 99.9 percent by weight based on the combined weight of polar organic compound and sulfur dioxide. More preferably, the amount of sulfur dioxide is in the range from about 60 to about 99 percent by weight based on the combined weight of polar organic compound and sulfur dioxide.

The anode used in the electrochemical cell of this invention can be constructed from either substantially pure lithium or a lithium alloy. Suitable lithium alloys for this purpose include, but are not limited to, lithium-aluminum, lithium-silicon and lithium-Wood's metal alloys.

The cathode of the electrochemical cell can be constructed of any material which is electrically conducting and is substantially inert to the electrolyte system. In addition, the cathode material is desirably catalytic with respect to electroreduction of the cathode depolarizer. Preferred materials include metals of the platinum group family consisting of platinum, iridium, osmium, palladium, rhodium and ruthenium; carbon in any of its common electrode forms; iron in its various forms, particularly as stainless steel; and metals from the group consisting of titanium, nickel, silver, mercury, lead and gold. Less preferred materials are metals of the families of vanadium, chromium and manganese [Groups 5b, 6b and 7b of the Periodic Table of Elements (*Handbook of Chemistry and Physics*, 57th ed., 1976–77, p. B-4)]; metals from the group consisting of zirconium, cobalt, zinc, cadmium, germanium, tin, antimony and bismuth; certain nitrides such as boron nitride; and semiconductors such as silicon. These materials can be used in any of the forms which are conventional in the art, such as rods, compacts, powders, pastes and the like. Highly preferred cathode materials include graphite or carbon bonded to an electrically conducting metal screen.

The following examples are intended only to illustrate the invention and are not to be construed as imposing limitations on it. The lithium tetrachloroaluminate ($LiAlCl_4$) referred to in these examples was, in each case, prepared by the in situ reaction between lithium chloride (LiCl) and aluminum chloride ($AlCl_3$).

COMPARISON EXAMPLES

A. Electrolyte: 1 molar $LiAlCl_4$ in $SO_2$

A flooded prismatic electrochemical cell was constructed which contained a lithium foil anode, a porous carbon cathode current collector and an electrolyte which consisted of a 1 molar solution of lithium tetrachloroaluminate ($LiAlCl_4$) in liquid sulfur dioxide. The lithium foil anode was 0.5 mm thick and had dimensions of about 1.5 cm×2.0 cm. The cathode current collector was a flat plate having a thickness of about 0.65 mm and dimensions of about 2 cm×2 cm which was prepared by attaching a mixture of 85 weight percent acetylene black and 15 weight percent Teflon to a stainless steel mesh support. The spacing between the two electrodes was about 1 cm. The resulting cell was found to have an open circuit voltage of 3.13 V and a discharge capacity of 1.75 mAh/cm$^2$ at 3.0 mA/cm$^2$ to a 2.0 V cutoff.

B. Electrolyte: 0.015 molar LiAlCl$_4$ in SO$_2$

An electrochemical cell was prepared as described in Comparison Example A except that the electrolyte consisted of a 0.015 molar solution of lithium tetrachloroaluminate (LiAlCl$_4$) in liquid sulfur dioxide and the cathode current collector was prepared using carbon black (Black Pearls 2000 obtained from the Cabot Corporation) rather than acetylene black. The resulting cell was found to have an open circuit voltage of 2.9 V and a discharge capacity of 3.3 mAh/cm$^2$ at 0.125 mA/cm$^2$ to a 2.0 V cutoff.

C. Electrolyte: 0.5 molar LiAlCl$_4$ in SO$_2$-Propylene Carbonate

An electrochemical cell was prepared as described in Comparison Example A except that the electrolyte consisted of a 0.5 molar solution of lithium tetrachloroaluminate (LiAlCl$_4$) in an approximately 2:8 mixture by volume of propylene carbonate and liquid sulfur dioxide. The resulting cell was found to have an open circuit voltage of 3.2 V and a discharge capacity of 2.2 mAh/cm$^2$ at 3.0 mA/cm$^2$ to a 2.0 V cutoff.

EXAMPLE I

An electrochemical cell was prepared as described in Comparison Example B except that the electrolyte was additionally 0.100 molar in aluminum chloride (AlCl$_3$). The resulting cell was found to have an open circuit voltage of 3.5 V and a discharge capacity of 15.4 mAh/cm$^2$ at 0.125 mA/cm$^2$ to a 2.0 V cutoff. Comparison of these results with those of Comparison Example B will demonstrate that the presence of a 0.100 molar concentration of aluminum chloride in the electrolyte served to increase the cell discharge capacity by a factor of 4.7. A cyclic voltammogram measured with a platinum electrode before discharge of the cell demonstrated that the discharge product was soluble since the peak height did not diminish on successive cathodic scans.

EXAMPLE II

An electrochemical cell was prepared as described in Comparison Example C except that the electrolyte was additionally 3.0 molar in aluminum chloride and the cathode current collector was placed between two lithium foil anodes. The resulting cell was found to have an open circuit voltage of 3.77 and a discharge capacity of 94.0 mAh/cm$^2$ at 3.0 mA/cm$^2$ to a 2.5 V cutoff. Comparison of these results with those of Comparison Example C will demonstrate that the presence of a 3.0 molar concentration of aluminum chloride in the electrolyte served to increase the cell discharge capacity by a factor of 42.7.

EXAMPLE III

An electrochemical cell was prepared as described in Example II except that the electrolyte consisted of a solution in a 2:8 mixture by volume of propylene carbonate and liquid sulfur dioxide which was 1.0 molar in lithium tetrachloroaluminate (LiAlCl$_4$) and 1.0 molar in aluminum chloride (AlCl$_3$). The resulting cell was found to have an open circuit voltage of 3.24 V and a discharge capacity of 15.8 mAh/cm$^2$ at 3.0 mA/cm$^2$ to a 2.5 V cutoff. The mole ratio of both AlCl$_3$ and LiAlCl$_4$ to sulfur dioxide in this cell was approximately 1 to 7.4.

EXAMPLE IV

A series of electrolytes was prepared which contained varying amounts of aluminum chloride (AlCl$_3$) and lithium tetrachloroaluminate (LiAlCl$_4$) dissolved in a 2:8 mixture by volume of propylene carbonate and liquid sulfur dioxide. These electrolytes were used in the construction of a series of electrochemical cells which, except for electrolyte, were substantially as described in Example II. The discharge capacity of each member of this series of cells at 3.0 mA/cm$^2$ is set forth in Table I together with the concentration of AlCl$_3$ and LiAlCl$_4$ in the electrolyte. The open circuit voltages of the members of this series of cells are set forth in Table II. The results from Examples II and III are also set forth in Tables I and II.

EXAMPLE V

A close packed prismatic electrochemical cell was constructed which contained a porous carbon cathode current collector sandwiched between two lithium foil anodes with glass fiber paper as a separator between the lithium electrodes and the cathode current collector. The cell also contained a large excess of an electrolyte which consisted of a solution of lithium tetrachloroaluminate (LiAlCl$_4$) and aluminum chloride (AlCl$_3$) in liquid sulfur dioxide which was 1.0 molar in LiAlCl$_4$ and 4.0 molar in AlCl$_3$. The lithium foil anodes were 0.5 mm thick and had dimensions of about 2 cm×2 cm. The cathode current collector was a flat plate having a thickness of about 0.65 mm and dimensions of about 2 cm×2 cm which was prepared by attaching a mixture of 85 weight percent acetylene black and 15 weight percent Teflon to a stainless steel mesh support. The resulting cell was found to have a discharge capacity of 5.9 mAh/cm$^2$ at 2.0 mA/cm$^2$ to a 2.0 V cutoff.

EXAMPLE VI

An electrochemical cell was prepared as described in Example V except that the electrolyte consisted of a solution of lithium tetrachloroaluminate (LiAlCl$_4$) and aluminum chloride (AlCl$_3$) in a 1:9 mixture by volume of propylene carbonate and liquid sulfur dioxide which was 1.0 molar in LiAlCl$_4$ and 4 molar in AlCl$_3$. The resulting cell was found to have a discharge capacity of 15.2 mAh/cm$^2$ at 2.0 mA/cm$^2$ to a 2.0 V cutoff. Comparison of this result with that of Example V will demonstrate that the use of 10 volume percent of propylene carbonate in liquid sulfur dioxide as the electrolyte solvent in place of pure liquid sulfur dioxide served to increase the cell discharge capacity by a factor of 2.6.

EXAMPLE VII

An electrochemical cell was prepared which contained a glass fiber paper electrode separator sandwiched between a lithium foil anode and a porous carbon cathode current collector. The cell also contained an electrolyte which consisted of a solution of lithium tetrachloroaluminate (LiAlCl$_4$) and aluminum chloride (AlCl$_3$) in a 2:8 mixture by volume of propylene carbonate and liquid sulfur dioxide which was 2.5 molar in LiAlCl$_4$ and 1.5 molar in AlCl$_3$. The lithium foil anode was 0.5 mm thick, was circular in shape, and had an active area (one side only) of about 2.4 cm$^2$. The cathode current collector was a circular flat plate having a thickness of about 0.65 mm and a diameter of about 1.95 cm which was prepared by attaching a mixture of 85 weight percent acetylene black and 15 weight percent Teflon to a stainless steel mesh support. The resulting cell was subjected to a series of charge/discharge cycles of 10.0 mAh/cm$^2$ (corresponding to about 24% lithium utilization) at a current density of 2.0 mA/cm$^2$ on discharge and 1.0 mA/cm$^2$ on charge. The cell completed 19.7 turnovers of lithium before falling. Accordingly, a satisfactory lithium plating efficiency was obtained in the cell.

TABLE I

Discharge Capacity as a Function of Electrolyte Composition.

| AlCl$_3$ (molar) | LiAlCl$_4$ (molar) | | | | | |
|---|---|---|---|---|---|---|
| | 0.5 | 1.0 | 1.5 | 2.0 | 2.5 | 3.5 |
| | mAh/cm$^2$ at 3 mA/cm$^2$ | | | | | |
| 1.0 | | 15.8 | | | | |
| 1.5 | 7.0 | | 35.7 | 25.7 | | |
| 2.0 | | 47.1 | 48.1 | 28.2 | 40.6 | |
| 2.5 | 64.1 | 67.8 | 47.4 | 29.2 | 18.8 | 10.3 |
| 3.0 | 94.0 | 77.4 | 32.8 | 14.5 | | |
| 3.5 | 81.5 | 42.7 | 21.2 | | 13.8 | |
| 4.0 | 52.1 | 41.1 | | 10.2 | | |
| 4.5 | 44.2 | | 19.9 | | | |
| 5.0 | | 17.3 | | | | |
| 5.5 | 24.6 | | | | | |

TABLE II

Open Circuit Voltage as a Function of Electrolyte Composition.

| AlCl$_3$ (molar) | LiAlCl$_4$ (molar) | | | | | |
|---|---|---|---|---|---|---|
| | 0.5 | 1.0 | 1.5 | 2.0 | 2.5 | 3.5 |
| | Volts | | | | | |
| 1.0 | | 3.24 | | | | |
| 1.5 | 3.32 | | 3.42 | 3.36 | | |
| 2.0 | | 3.61 | 3.59 | 3.53 | 3.57 | |
| 2.5 | 3.73 | 3.69 | 3.65 | 3.64 | 3.61 | 3.58 |
| 3.0 | 3.77 | 3.72 | 3.66 | 3.64 | | |
| 3.5 | 3.79 | 3.76 | 3.70 | | 3.64 | |
| 4.0 | 3.80 | 3.74 | | 3.66 | | |
| 4.5 | 3.78 | | 3.70 | | | |
| 5.0 | | 3.72 | | | | |
| 5.5 | 3.80 | | | | | |

EXAMPLE VIII

A rechargeable electrochemical cell enclosed in a standard size metal C$_s$ casing (cylindrical in shape having a height of about 3.8 cm and a diameter of about 2.2 cm) was prepared which contained an electrode pack which was prepared by sandwiching a glass fiber paper electrode separator between a lithium foil anode (18×2.54×0.041 cm) and a flexible carbon cathode current collector (20×2.54×0.065 cm) and rolling the resulting sandwich structure into a roll. The cell also contained 16.0 g of an electrolyte which consisted of a solution of lithium tetrachloroaluminate (LiAlCl$_4$) and aluminum chloride (AlCl$_3$) in a 2:8 mixture by volume of propylene carbonate and liquid sulfur dioxide which was 1.0 molar in LiAlCl$_4$ and 3.0 molar in AlCl$_3$. The cathode current collector was prepared by attaching a mixture of 85 weight percent acetylene black and 15 weight percent Teflon to a stainless steel mesh support. The resulting cell was subjected to a series of charge/discharge cycles of 500 mAh at 250 mA on discharge and a tapered charge of 400 mAh at 125 mA and the remaining 100 mAh at 63 mA. The cell completed 51 cycles before the discharge capacity to a 2.0 V cutoff fell below 500 mAh. This cumulative performance corresponds to 6.6 turnovers of the lithium and 7.2 turnovers of the sulfur dioxide.

EXAMPLE IX

An electrochemical cell was prepared as described in Example VIII except that: (a) the electrolyte was a solution in liquid sulfur dioxide of propylene carbonate, lithium tetrachloroaluminate (LiAlCl$_4$) and aluminum chloride (AlCl$_3$) which was 0.77 molar in propylene carbonate, 1.0 molar in LiAlCl$_4$ and 3.1 molar in AlCl$_3$; (b) the lithium foil anode had dimensions of 20×2.54×0.041 cm; and (c) the metal C$_s$ casing was left open at one end so that it could be filled with electrolyte after placing it upright in a larger glass research cell. The resulting cell was found to have a discharge capacity of 847 mAh upon discharge at 200 mA to a 2.5 V cutoff.

EXAMPLE X

An electrochemical cell was prepared as described in Example IX except that the electrolyte was a solution in liquid sulfur dioxide of 1,3-dioxolane, lithium tetrachloroaluminate (LiAlCl$_4$) and aluminum chloride (AlCl$_3$) which was 0.74 molar in 1,3-dioxolane, 1.0 molar in LiAlCl$_4$ and 3.0 molar in AlCl$_3$. The resulting cell was found to have a discharge capacity of 890 mAh upon discharge at 200 mA to a 2.5 V cutoff.

EXAMPLE XI

A series of electrolyte solutions was prepared by dissolving varying amounts of aluminum chloride (AlCl$_3$) in mixtures of propylene carbonate and liquid sulfur dioxide, and saturating each of the resulting solutions with lithium chloride (LiCl). The lithium salt present in the resulting electrolyte solutions is assumed to be lithium tetrachloroaluminate (LiAlCl$_4$) which is formed by the in situ reaction between AlCl$_3$ and LiCl. The composition of these electrolyte solutions is set forth in Table III. These electrolytes are highly satisfactory for use in a rechargeable lithium-sulfur dioxide electrochemical cell.

EXAMPLE XII

An electrochemical cell was prepared as described in Example II except that the electrolyte consisted of a solution of lithium tetrachloroaluminate (LiAlCl$_4$) and aluminum chloride (AlCl$_3$) in a 2:8 mixture by volume of γ-butyrolactone and liquid sulfur dioxide, which was about 3 molar in LiAlCl$_4$ and about 1 molar in AlCl$_3$. This electrolyte was obtained by: (a) preparing a 4.0 molar solution of AlCl$_3$ in a 2:8 mixture by volume of γ-butyrolactone and liquid sulfur dioxide and (b) saturating the resulting solution with lithium chloride (LiCl). The cell was found to have a discharge capacity of 18.8 mAh/cm$^2$ at 3.0 mA/cm$^2$ to a 2.5 V cutoff.

TABLE III

Electrolyte Compositions.[1]

| [Al][2] | [Li][3] | PC in Premix,[4] Wt. % | [PC][5] | [SO$_2$][5] | Wt. % PC | Wt. % SO$_2$ |
|---|---|---|---|---|---|---|
| 2.41 | 1.00 | 17.5 | 1.96 | 14.8 | 13.3 | 62.7 |
| 3.14 | 1.67 | 17.5 | 1.79 | 13.5 | 11.9 | 56.2 |
| 3.84 | 2.62 | 17.5 | 1.66 | 12.5 | 10.6 | 50.2 |
| 3.91 | 2.76 | 18.1 | 1.70 | 12.3 | 10.9 | 49.2 |

TABLE III-continued

Electrolyte Compositions.[1]

| [Al][2] | [Li][3] | PC in Premix,[4] Wt. % | [PC][5] | [SO$_2$][5] | Wt. % PC | Wt. % SO$_2$ |
|---|---|---|---|---|---|---|
| 4.19 | 2.92 | 17.5 | 1.57 | 11.8 | 10.0 | 47.3 |
| 4.52 | 3.64 | 17.5 | 1.48 | 11.1 | 9.30 | 44.0 |
| 5.14 | 3.98 | 17.2 | 1.31 | 10.0 | 8.22 | 39.4 |
| 2.26 | 1.60 | 8.55 | 0.986 | 16.8 | 6.51 | 69.6 |
| 3.06 | 2.58 | 9.17 | 0.957 | 15.1 | 6.17 | 61.2 |
| 3.58 | 3.08 | 8.55 | 0.842 | 14.4 | 5.33 | 57.0 |
| 4.08 | 3.66 | 8.85 | 0.811 | 13.3 | 5.06 | 52.1 |
| 5.07 | 4.71 | 7.97 | 0.616 | 11.3 | 3.78 | 43.6 |

[1]The abbreviation "PC" in this table refers to propylene carbonate.
[2]Concentration of aluminum expressed in gram-atoms per liter of solution and determined by atomic absorption spectroscopy.
[3]Concentration of lithium expressed in gram-atoms per liter of solution and determined by atomic absorption spectroscopy.
[4]"PC in Premix" refers to the weight percent of propylene carbonate in the initial solvent mixture of propylene carbonate and liquid sulfur dioxide from which the electrolytes were prepared.
[5]Concentration expressed in moles per liter.

We claim:

1. A nonaqueous conductive liquid which comprises a solution of aluminum chloride and at least one lithium salt in a mixture of liquid sulfur dioxide with at least one polar organic compound wherein said polar organic compound has a Donor Number in the range from about 10 to about 25.

2. The liquid of claim 1 wherein said polar organic compound is selected from the group consisting of propylene carbonate, ethylene carbonate, 1,2-dimethoxyethane, 1,3-dioxolane, acetonitrile and γ-butyrolactone.

3. The liquid of claim 1 wherein said mixture of liquid sulfur dioxide and polar organic compound contains from about 60 to about 99 percent by weight of sulfur dioxide.

4. The liquid of claim 1 wherein the ratio of moles of aluminum chloride to equivalents of lithium cation in said solution is in the range from about 0.01 to about 50.

5. The liquid of claim 1 wherein the concentration of aluminum chloride in said solution is in the range from about 0.1 to about 6 molar.

6. The liquid of claim 1 wherein said lithium salt comprises lithium tetrachloroaluminate.

7. The liquid of claim 1 wherein the mole ratio of sulfur dioxide to aluminum chloride in said solution is in the range from about 2.0 to about 175.

8. An electrochemical cell wherein sulfur dioxide is electrochemically reduced upon discharge which comprises in combination:
   (a) an anode which is comprised of lithium;
   (b) a cathode; and
   (c) a nonaqueous conductive liquid electrolyte which comprises a solution of aluminum chloride and at least one lithium salt in a mixture of liquid sulfur dioxide and at least one polar organic compound, said polar organic compound having a Donor Number in the range from about 10 to about 25.

9. The electrochemical cell of claim 8 wherein said polar organic compound is selected from the group consisting of propylene carbonate, ethylene carbonate, 1,2-dimethoxyethane, 1,3-dioxolane, acetonitrile and γ-butyrolactone.

10. The electrochemical cell of claim 8 wherein the amount of sulfur dioxide is in the range from about 60 to about 99 percent by weight based on the combined weight of polar organic compound and sulfur dioxide.

11. The electrochemical cell of claim 8 wherein the ratio of moles of aluminum chloride to equivalents of lithium cation in said solution is in the range from about 0.01 to about 50.

12. The electrochemical cell of claim 8 wherein the concentration of aluminum chloride in said solution is in the range from about 0.1 to about 6 molar.

13. The electrochemical cell of claim 8 wherein said lithium salt comprises lithium tetrachloroaluminate.

14. The electrochemical cell of claim 8 wherein the mole ratio of sulfur dioxide to aluminum chloride in said solution is in the range from about 2.0 to about 175.

15. A process for electrodepositing lithium comprising electrolyzing a nonaqueous solution which comprises aluminum chloride and at least one lithium salt dissolved in a mixture of liquid sulfur dioxide and at least one polar organic compound, said polar organic compound having a Donor Number in the range from about 10 to about 25, wherein the mole ratio of sulfur dioxide to aluminum chloride in said solution is at least about 1.05.

16. The process of claim 15 wherein the mole ratio of sulfur dioxide to aluminum chloride in said solution is in the range from about 2.0 to about 175.

* * * * *

UNITED STATES PATENT OFFICE
CERTIFICATE OF CORRECTION

Patent No. 4,752,541             Dated June 21, 1988

Inventor(s) Larry R. Faulkner and Isobel J. Davidson

It is certified that error appears in the above-identified patent and that said Letters Patent is hereby corrected as shown below:

Column 1, line 55, "567,515" should read --3,567,515--.

Column 9, line 13, "falling" should read --failing--.

Signed and Sealed this

Twenty-seventh Day of June, 1989

Attest:

DONALD J. QUIGG

Attesting Officer

Commissioner of Patents and Trademarks